United States Patent Office 3,794,600
Patented Feb. 26, 1974

3,794,600
ZEOLITE-L CATALYST PREPARATION METHOD
Hans U. Schutt, Lafayette, Calif., assignor to Shell Oil Company, Houston, Tex.
No Drawing. Filed Jan. 7, 1972, Ser. No. 216,265
Int. Cl. B01j 11/40
U.S. Cl. 252—455 Z
9 Claims

ABSTRACT OF THE DISCLOSURE

A low alkali content crystalline alumino-silicate L-zeolite catalyst is prepared by (a) selecting a high silica-alumina content L-zeolite (Si/Al $>3$); (b) contacting the zeolite with an aqueous solution of an ammonium salt, (c) calcining at a temperature below about 600° C., (d) contacting the calcined zeolite with an aqueous ammonium salt solution containing chromate ions, (e) repeating steps (c) and (d) or (b) until the alkali metal content is reduced below about 0.35% wt. and the crystallinity loss is not greater than 20%, and (f) compositing the zeolite with hydrogenating-dehydrogenating metals of Group VI-B and/or Group VIII. The composite is an effective isomerization or hydrocracking catalyst.

BACKGROUND OF THE INVENTION

Field of the invention

This invention relates to an improved crystalline alumino-silicate zeolite L-type catalyst with a low alkali content for use in hydrocarbon conversion processes such as isomerization or hydrocracking.

Description of the prior art

Metallo-silicate zeolites are well known in the art and particularly the alumino-silicates have been used for many purposes. A particular application based on the crystalline structure of many zeolites has led to their designation as "molecular sieves." Another important application of metallo-silicates is their use as hydrocarbon conversion catalysts. Although the zeolites proper may show catalytic activity without adding metals, they are generally composited with one or more metal components in order to impart hydrogenating-dehydrogenating properties to the finished catalysts. Zeolite L, described in U.S. Pat. 3,216,789, has not heretofore found wide application as a catalyst or catalyst support because of the difficulty in removing residual potassium from the zeolite structure without destroying its crystallinity.

It is generally recognized that the exceptional qualities of zeolites as hydrocarbon conversion catalysts are dependent both on the crystalline structure and on the acidic centers present in the zeolite. The acidic centers are responsible for promoting those hydrocarbon conversion reactions which involve the formation of carbonium ions. Such reactions include isomerizatoin, cracking, alkylation, dealkylation, hydrocracking and polymerization. The catalytic properties of the alumino-silicate zeolites are greatly influenced by the silica-to-alumina molar ratio, the kind of metal ions present in the crystal lattice and the number of metal-ion deficient sites creating the acidic centers.

Generally alumino-silicate zeolites contain alkali metal and alkaline earth metal ions, either naturally present in the zeolite or incorporated therein during preparation of the synthetic product. However, sodium and potassium are particularly undesirable in hydrocarbon conversion catalysts because the catalytic activity is adversely affected. These alkali metal ions can be removed by ion exchange with mono or polyvalent cations and/or ammonium ions or hydrogen ions. A successive treatment of mordenite, for instance, with an aqueous solution of an acid and of an ammonium compound yields a zoelite with a sodium content, expressed as $Na_2O$, well below 1% wt. However, zeolites with a $SiO_2/Al_2O_3$ molar ratio below 10 are less suitable for being treated with an acid because exposure to hot acids, even if weak, generally results in ultimate collapse of the zeolitic crystal lattice.

When zeolite Y, which has a $SiO_2/Al_2O_3$ molar ratio of about 3–6, exchanges ions with an aqueous solution comprising ammonium ions the $Na_2O$ content of the material is readily lowered to about 3% wt., but it is difficult to further decrease its sodium content. To obtain an alkali metal content of less than 1% wt., twenty or more successive treatments with an ammonium salt-solution have been necessary (see U.S. 3,391,075). Moreover, the thermal stability of the crystal lattice of zoelite Y is adversely affected by this very low $Na_2O$ content.

Methods for reducing the sodium content of zeolites to less than 1% wt., expressed as the oxide, while retaining thermal stability are described in U.S. Pat. 3,375,065 and 3,402,996. These methods, which are applicable to L-zeolite, consist of a cation exchange step followed by a heat treatment step followed by another cation exchange step. However, when L-zeolite is treated in this manner before being used as a catalyst support the resulting catalyst is less active than many other zeolite-based catalysts.

SUMMARY OF THE INVENTION

It has now been discovered that a highly active and structurally and thermally stable hydrocarbon conversion catalyst based on zeolite L-type alumino-silicates of low alkali metal content can be prepared by (a) Selecting an L-zeolite having a silicon/aluminum ratio greater than about 3;

(b) Contacting the zeolite with an aqueous solution of an ammonium salt at about 100° C.;

(c) Calcining the zeolite at a temperature below about 600° C.;

(d) Contacting the calcined zeolite with an aqueous ammonium salt solution containing chromate ions at about 100° C.;

(e) Repeating steps (c) and (d) or (b) until the alkali metal content of the zeolite is reduced below about 0.35% wt. and the crystallinity loss is not greater than 20% of that of the starting zeolite; and (f) Compositing the zeolite with hydrogenating metals selected from Groups VI–B and VIII and drying and calcining the composite.

DETAILED DESCRIPTION

The catalysts of the invention are based on truly decationized or metal-defiicient alumino-silicate zeolites. By this is meant that in the zeolite the alkali metal ions have only been replaced by hydrogen and/or ammonium ions, and not by other mono or polyvalent cations for stability reasons. Frequently in prior art publications the word "decationized" is used with reference only to the alkali metal content of the zeolite. The rare-earth zeolites mentioned hereinbefore, for instance, have a low alkali metal content but are not metal-deficient because rare-earth cations have been substituted for alkali metal ions.

Crystalline zeolites strongly adsorb molecules that are small enough to penetrate the intra-crystalline cavities. As a result adsorption measurements of nitrogen, water, benzene and cyclohexane have commonly been used to determine the intra-crystalline volume of zeolitic solids.

A benzene adsorption test has been used herein as an effective measure of zeolite crystallinity, even in the presence of amorphous solids. The rate of vaporization at room temperature from a zeolite wetted by a volatile liquid, such as benzene, drops to a lower value after excess liquid has been vaporized. The quantity of liquid that remains sorbed by the zeolite at this stage of the vaporization process is an accurate measure of intra-crystalline volume.

The vaporization technique consists of adding excess liquid (about 5 ml.) to a catalyst sample (1 to 4 grams) and weighing the liquid retained by the sample as a function of time while it is swept by a stream of dry nitrogen (50 ml./min.) at room temperature. The sample holder consists of a glass tube capped with a rubber septum to exclude water and carbon dioxide. The nitrogen is introduced by means of a hypodermic needle that pierces the rubber cap. Catalyst samples are generally calcined for 2 hours at 500° C. directly before the vaporization measurements.

Zeolite L, which is only known as a synthetic product, has a specific $SiO_2/Al_2O_3$ ratio of about 5 to 7. Zeolite L may be represented by the general molar formula

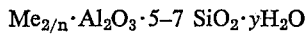

$$Me_{2/n} \cdot Al_2O_3 \cdot 5\text{-}7 \ SiO_2 \cdot yH_2O$$

in which Me is a metal ion of a valence $n$, in particular potassium and smaller amounts of sodium, and $y$ is in the range of from 0 to 10.

One sample of L-sieve zeolite as received from the manufacturer (Linde SK-45) contained about 10% wt. potassium and up to 0.2% wt. sodium. In the calcined state its benzene sorption amounted to 8.0% wt. This material was exchanged three times with 2-molar aqueous ammonium nitrate solution at boiling temperature for 2 hours each. The sample was dried at 100° C. and given a staged calcination which consists of calcining 2 hours each at temperatures of 200° C., 350° C. and 500° C. After this treatment, the potassium content had declined to about 2.0–2.5% wt. while the benzene sorption remained essentially unchanged from the calcined raw material, i.e., about 7.5% wt. After two more exchanges with ammonium nitrate solution and another staged calcination up to 500° C. the potassium content was reduced to about 1% wt. while the sodium content had been reduced to a negligible 0.006% wt.

In addition to ammonium-containing salt solutions, thionylchloride, acetylacetone, and ammonium chromate solutions have been employed to protectively leach some of the aluminum from the L-sieve crystalline framework, thus possibly partially opening cages in satellite side channels of the structure and allowing potassium to escape from these. An evaluation of this approach was obtained through potassium analyses and determination of the degree of crystallinity retained via benzene sorption measurements (grams benzene sorbed per 100 g. of catalyst after vaporization from the sample in flowing nitrogen for 20 hours at 25° C.).

The most important test used, however, consisted of incorporating about 0.3% wt. platinum (by ion-exchange with an aqueous tetrammine platinum dichloride, ammonium nitrate solution at pH 7) into the various L-sieve supports and measuring their catalytic activity in a standardized normal hexane isomerization test. This test was conducted at 450 p.s.i.g. pressure, 260° C., 1.0 weight hourly space velocity, and 2.2 hydrogen/hexane molar ratio. Under the conditions employed 83% conversion of n-hexane would indicate equilibrium yielding a product having the following composition: 2,2-dimethylbutane—21%; 2,3-dimethylbutane and 2-methylpentane—42%; 3-methylpentane—20%; n-hexane—17%. Using an L-sieve zeolite catalyst support containing 0.8% wt. potassium, up to 41% n-hexane was converted to its isomers in this test.

According to this invention the metal ions are removed from L-zeolite by subjecting the zeolite one or more times to a treatment comprising contacting it at least once with an aqueous ammonium salt solution; calcining the ammonium-exchanged zeolite at a temperature below about 600° C.; after which the calcined material is contacted at least once with an aqueous ammonium salt solution containing from about 5 to 25 grams/liter chromate ions. The ion exchange treatment in the presence of ammonium and chromate ions and the calcining treatment are repeated until the alkali metal content of the zeolite is reduced below about 0.35% wt. and the crystallinity loss is not greater than 20–25% of the starting zeolite, i.e., a benzene adsorption value of about 6% wt. Although the function of chromate ions is not understood, catalysts prepared from L-sieve zeolites treated in this manner are about 30% more active.

L-sieve zeolite as received or prepared generally has an alkali metal content of from 10 to 15% wt., as alkali metal oxide (including about 10% wt. potassium and about 0.2% wt. sodium), i.e., well above 2% wt. The treatment described in the preceding paragraph is performed so that the alkali metal content is reduced to less than about 0.35% wt., and preferably to a value in the range of from 0.01 to 0.2% wt. Generally, it is sufficient if the zeolite is heated three times with a fresh ammonium-ion-containing solution prior to the first calcination, which is preferably performed at about 500° C. After calcining, the zeolite is then generally contacted 2 or 3 times with an aqueous solution of ammonium and chromate ions and the zeolite is again calcined as before. The process of the invention is then continued by treating the calcined zeolite with an aqueous ammonium salt solution before depositing catalytically active hydrogenating-dehydrogenating metal components onto the low alkali metal content zeolite.

The calcination temperature is preferably between 300 and 600° C. and more preferably in the range of from 450 to 550° C. If the first calcination temperature exceeds about 700° C. an excessive loss of crystallinity is experienced. Calcination is applied for a period of at least 30 minutes. Excellent results are obtained with calcination periods of from 2 to 4 hours, but longer periods may be used, if desired. Calcination may be carried out in air.

The ammonium ions in the aqueous solution used for heating the zeolitic material are preferably derived from the common inorganic ammonium salts such as ammonium nitrate, chloride, sulfate and the like, ammonium nitrate being preferred. However, aqueous solutions of ammonium salts of other mineral acids and of lower organic acids such as formic acid, acetic acid, citric acid, oxalic acid and benzoic acid, may be used as well. Instead of ammonium ions, N-substituted ammonium ions such as N-mono, di- or tetraalkylammonium ions may be utilized. The latter compounds are exemplified by tetraethyl- or tetramethylammonium chloride, nitrate or sulfate. Instead of ammonium salts the salts of organic nitrogen bases such as hydroxylamine, hydrazine, or guanidine may be employed. For the purpose of the present invention the latter compounds are included in the ammonium compounds.

The chromate ions may be supplied in any anionic form of chromium not associated with a metallic cation such as $((NH_4)_2Cr_2O_7$ or $(NH_4)_2CrO_4$, $CrO_3$ in aqueous solution, etc. The concentration is not critical but should generally range between about 3 and 30 grams of the ammonium dichromate per liter of ammonium salt solution. Concentrations of about 6 g. of ammonium dichromate per liter of 2 M ammonium nitrate solution are satisfactory.

Temperature and pressure during heating of the zeolite with the aqueous solution comprising ammonium ions may vary between wide limits but generally the ion-exchange treatment is carried out at substantially atmospheric pressure and a temperature between 50 and 120° C. More preferably the treatment is carried out by boiling the zeolite with the ammonium ion-containing solution. The concentration of the solution used is generally from 0.5 to 3 molar relative to the ammonium ions. Although each contacting period may be continued for as long as 3 hours, a contacting period of 1 hour is usually sufficient for obtaining satisfactory results. After each treatment with the boiling nitrogen-base containing solution the exchanged zeolite may be rinsed with ion-free water before it is heated anew with a fresh solution. Before the ammonium exchanged material is calcined it is preferably dried at a temperature between 100 and 200° C.

The ammonium-exchanged zeolite of low alkali metal content finally obtained is composited with one or more catalytically active hydrogenating-dehydrogenating metal components. Metals of this nature are for instance copper, silver, zinc, cadmium, vanadium, chromium, antimony, molybdenum, tungsten, manganese, rhenium, the iron group metals and the platinum group metals. Particularly preferred, however, are the metals belonging to Group VI–B and/or Group VIII of the Periodic System, such as tungsten, molybdenum, cobalt and nickel, or combinations thereof, and palladium and platinum. These metal components are preferably deposited onto the zeolite from a solution comprising a compound of these metals according to any technique well known in the art, such as impregnation, slurry impregnation, or competitive ion exchange in the presence of ammonium nitrate. It is preferred however to deposit these metal components onto an L-zeolite which is substantially in the ammonium form.

The catalysts of the present invention are particularly suitable for hydrocarbon conversion processes such as hydrocracking and isomerization. The isomerization catalyst preferably comprises a noble metal as the catalytically active metal component whereas non-noble metals or a combination of such metals are preferred for the hydrocracking catalysts. When noble metals of the platinum group are used, it is preferred that the metal content of the catalyst is from 0.1 to 5% wt. and more preferably from 0.2 to 2% wt. of zeolite support. A particularly preferred noble metal is palladium or platinum.

The non-noble metals are generally used in an amount of from 1 to 35% wt. of metal or combination of metals. A particularly preferred metal combination comprises a metal of Group VI–B and a metal of the iron group. Preferred hydrocracking catalysts comprise from 15 to 30% wt., and more preferably from 18 to 25% wt., of the non-noble metal (iron group) of Group VIII metals and from 0.1 to 30% wt., and more preferably from 2 to 10% wt., of the Group VI–B metal. A particularly preferred metal combination is from 15–30% wt. nickel and from 0.1–6/ wt. tungsten.

Following the deposition of the catalytically active metal component(s) on the support the catalyst is usually dried (temperatures between 100 and 200° C.) and calcined in a non-reductive environment at a temperature of about 450–700° C. The time of calcination is not critical but should be sufficient for decomposition of any ammonium compound present, and to convert the metals deposited as a metal compound to their corresponding oxides. Generally, 1 to 5 hours at a temperature of 500° C. will suffice.

Hydrocarbon conversion catalysts are generally used in the form of discrete particles such as extrudates, pellets, granules, spheres and the like, usually ranging in size from about 0.1 to 5 mm. Shaped catalysts of these sizes are preferably used in fixed-bed operation. Smaller catalyst particles may be used in fluidized or slurry reactor systems.

The zeolite used for the catalyst preparation is often in the form of a powder of a particle size of about $5\mu$ or less than $5\mu$ diameter and it may be shaped to larger-sized particles by mere application of an external pressure or by the use of a binder. It is preferred to shape the zeolite after the metal deposition and prior to the final calcination by which the metals are converted to their corresponding oxides. In case a binder is used, this should preferably be free from alkali metal.

The catalysts of the invention are highly active hydrocracking catalysts and in comparison with known catalysts a high conversion of the hydrocarbons to be hydrocracked can be obtained even at relatively low temperatures. This is highly advantageous with respect to catalyst life. On the other hand, relatively high space velocities of the feed to be converted may be used when applying higher cracking temperatures. These catalysts moreover remain sufficiently active in the presence of nitrogen-containing compounds, which compounds may be present in the feed to be hydrocracked in an amount exceeding 500 p.p.m.w. nitrogen.

The noble metal-containing catalysts of the invention are also highly active isomerization catalysts. Preferably the isomerization is carried out in the protective presence of hydrogen. With the isomerization catalysts of the invention any hydrocarbon with at least 4 carbon atoms in its molecule may be converted to a more highly branched hydrocarbon. The catalysts are particularly suitable for isomerizing hydrocarbons with from 5 to 10 carbon atoms, or mixtures of said hydrocarbons. Usually no hydrocarbons or hydrocarbon mixtures boiling above 600° C. will be chosen as the feed.

When using hydrogen to protect the catalyst from deactivation it is also possible to choose hydrocarbon mixtures comprising olefinic hydrocarbons as the isomerization feed since the unsaturates present are converted into isoparaffins. In an analogous manner alkyl and alkenyl groups of alkyl- and alkenyl aromatics can be isomerized and, if desired, hydrogenated. In addition it is possible to isomerize naphthenic compounds by the process of the invention.

Isomerization is preferably carried out at a temperature between 200 and 400° C. and more preferably of from 225° to 350° C. The hydrogen partial pressure may vary between 40 and 1400 p.s.i.g. and more preferably between 140 and 700 p.s.i.g. The space velocity may vary from 0.5 to 10 volumes of hydrocarbon feed per volume of catalyst per hour and the gas rate from about 1000 to 20,000 s.c.f. of hydrogen per barrel feed.

The process of the present invention will be further explained by means of the following examples which are not considered limiting, but are merely intended to be illustrative of preferred modes of practicing the invention.

EXAMPLE I

This example demonstrates that to make a good catalyst using L-zeolite as a support its potassium content must be reduced to below about 0.35% wt. while at least about 75% of its crystallinity is retained.

The L-zeolite (SK–45) used in these experiments was obtained from Union Carbide and had an Si/Al ratio of 3.3. In one set of experiments (1–3, Table 1), intermediate products were soaked with thionylchloride at room temperature for periods of 3 to 18 hours with or without addition of ammonium dichromate. The samples were ion-exchanged once more with aqueous ammonium nitrate solution and given a staged calcination with a final temperature of 500° C. Benzene sorption values of 6.0 to 7.3% wt. were obtained, while after one further exchange with aqueous ammonium nitrate solution, incorporation of 0.35 to 0.43% wt. platinum, and staged calcination, the potassium levels decreased to 0.27 to 0.32% wt. When the treatment was applied during the third exchange phase, a substantial portion of the crystallinity was destroyed leading to a benzene sorption of only 2.7% wt. (Example 4, Table 1). Possibly, the crystals become less stable when the alkaline metal content gets too low. In any event, highest isomerization activity (>50%) was achieved with catalysts of relatively high benzene sorption (>6% wt.) and low potassium content (below about 0.35% wt.) as exemplified by experiment Nos. 2 and 3, Table 1.

In another set of experiments (5–8, Table 1), intermediate products were soaked with acetylacetone for 3 hours at room temperature and at 75° C. with or without addition of ammonium dichromate. Again, the samples were ion-exchanged once more with aqueous ammonium nitrate solution and given a staged calcination with a final temperature of 500° C. In this case, benzene sorption amounted to 6.5 to 8.0% wt., while after one further exchange with aqueous ammonium nitrate solution, incorporation of 0.31 to 0.55% wt. platinum and staged calcination, the potassium levels decreased to about 0.35% wt. Similar values, except for a lower potassium content of 0.23% wt., were obtained when the treatment was applied during the third exchange phase (Example 9, Table 1) which seemed to indicate that acetylacetone is a milder leaching agent even at 75° C. It was most effective when combined with some ammonium dichromate as demonstrated by isomerization conversion levels of 61 and 50% in experiment Nos. 7 and 9, Table 1.

In still another set of experiments (10–13, Table 1), intermediate products were ion-exchanged with aqueous solutions of ammonium dichromate alone or in combination with ammonium nitrate. The treatments were accomplished either during the third exchange phase or during both the second and third phase. After incorporation of 0.24 to 0.41% wt. platinum and a final staged calcination, potassium levels ranged from 0.27 to 0.34% wt. while benzene sorption values of 5.6 to 7.2% wt. were measured. As would have been expected by taking into account both sets of data (low potassium and good retention of crystallinity) isomerization activity was generally high leading to 53.6 to 59.5% conversion to isomers in the standardized isomerization test.

From the results obtained in experiments 1–13, Table 1, it is apparent that for good isomerization activity (Examples 7, 11 and to a lesser degree 3) potassium levels of L-zeolite must be below about 0.35% wt., while benzene sorptions must be preserved around 6% wt. or above, which would roughly allow a 20–25% loss from the 7.5 to 8.0% wt. measured after the first exchange series. At no occasion was chromium detected in the finished catalyst when ammonium chromate was employed in one of the exchange processes.

Two different batches of SK-45 L-sieve zeolite, both obtained from Union Carbide Corporation, were used in these experiments. One of these, sample A (Si/Al wt.=2.9), had low crystallinity retention under conditions of severe potassium reduction, while the other one, sample B (Si/Al wt.=3.3), showed high crystallinity retention under identical circumstances.

In these tests, the zeolite was first boiled three times for two hours each in two molar aqueous ammonium nitrate solution, filtered, water-washed, dried and ultimately given a staged calcination at 200° C., 350° C. and 500° C. for two hours at each level. Then the ion-exchange was resumed. However, except for the base cases, 6 g. ammonium dichromate was added to one liter of ammonium nitrate exchange solution. Two such exchanges were performed successively before the samples were given a second staged calcination. Then, all samples were ion-exchanged again in two molar aqueous ammonium nitrate solution, water-washed and dried. About 0.4% wt. platinum was incorporated into the pretreated bases, which were then subjected to a final staged calcination. At this point, potassium analyses and benzene sorption values were obtained. Isomerization results for the various catalysts under the standardized test conditions are summarized in Table 2.

Samples A and B were strikingly different in the degree of crystallinity retention after having been subjected to identical treatments. This is evident from benzene sorption values of around 3% wt. for sample A as compared to values around 6% wt. for sample B. Parallelling these findings, conversion to isomers ranged from 27 to 35% in the former and from 48 to 65% in the latter series of platinum-containing catalysts. Isomerization activities TABLE 1.
n-Hexane isomerization over Pt on L-sieve zeolites

| Experiment No. | First exchange series [1] | Second exchange series [1] | Third exchange series [1] | Pt, percent wt. | K, percent wt. | Benzene sorption, percent wt. | Total conversion, percent | Total isomers, percent | $C_1$–$C_5$, percent wt. |
|---|---|---|---|---|---|---|---|---|---|
| 1 | 3 ANE [2] | Exposure to $SOCl_2$; RT;[3] 18 hrs.; 1 ANE. | 1 ANE and Pt incorporation | 0.43 | 0.27 | 6.8 | 37.0 | 33.9 | 3.[1] |
| 2 | 3 ANE | Exposure to $SOCl_2$; RT; 5 hrs; 1 ANE. | do | 0.35 | 0.32 | 6.0 | 56.2 | 51.8 | 4.4 |
| 3 | 3 ANE | Exposure to $SOCl_2$ sat. $(NH_4)_2Cr_2O_7$; RT; 3 hrs.; 1 ANE. | do | 0.37 | 0.28 | 7.3 | 52.6 | 50.8 | 1.8 |
| 4 | 3 ANE | 2 ANE | Exposure to $SOCl_2$ sat. $(NH_4)_2Cr_2O_7$; RT; 2 hrs.; 1 ANE; Pt incorporation. | 0.37 | 0.16 | 2.7 | 37.3 | 27.8 | 9.5 |
| 5 | 3 ANE | Exposure to $(CH_3CO)_2CH_2$; RT;[3] 3 hrs.; 1 ANE. | 1 ANE and Pt incorporation | 0.43 | 0.37 | 6.9 | 39.6 | 37.3 | 2.3 |
| 6 | 3 ANE | Exposure to $(CH_3CO)_2CH_2$; 75° C.; 3 hrs.; 1 ANE. | do | 0.55 | 0.33 | 6.5 | 42.4 | 38.9 | 3.5 |
| 7 | 3 ANE | Exposure to $(CH_2CO)_2CH_2$; $(NH_4)_2Cr_2O_7$ added; 75° C.; 3 hrs.; 1 ANE. | do | 0.31 | 0.36 | 6.6 | 63.6 | 61.0 | 2.3 |
| 8 | 3 ANE | Exposure to $(CH_3CO)CH_2$ sat. $(NH_4)_2Cr_2O_7$; 75° C.; 3 hrs.; 1 ANE. | do | 0.43 | 0.36 | 8.0 | 52.8 | 42.9 | 3.6 |
| 9 | 3 ANE | 2 ANE | Exposure to $(CH_3CO)CH_2$ sat. $(NH_4)_2Cr_2O_7$; 75° C.; 2 hrs.; 1 ANE and Pt incorporation. | 0.44 | 0.23 | 6.2 | 53.7 | 50.1 | 3.6 |
| 10 | 3 ANE [2] | 2 ANE | Boiling with 25 g. $(NH_4)_2Cr_2O_7$ in 1 l.$H_2O$; 2 hrs.; Pt incorporation. | 0.24 | 0.34 | 5.6 | 57.6 | 53.6 | 4.0 |
| 11 | 3 ANE | 2 ANE | Boiling with 25 g. $(NH_4)_2Cr_2O_7$ in 1 l. 2m. $NH_4NO_3$ solution; 2 hrs.; Pt incorporation. | 0.36 | 0.29 | 7.2 | 62.2 | 59.5 | 2.7 |
| 12 | 3 ANE | 2 ANE with 25 g. $(NH_4)_2Cr_2O_7$ added to 1 l. solution. | 1 ANE with 25 g. $(NH_4)_2Cr_2O_7$ added to 1 l. solution; Pt incorporation. | 0.32 | 0.32 | 5.9 | 60.6 | 57.7 | 2.9 |
| 13 | 3 ANE | 2 ANE with 12.5 g. $(NH_4)_2Cr_2O_7$ added to 1 l. solution. | 1 ANE with 12.5 g. $(NH_4)_2Cr_2O_7$ added to 1 l. solution; Pt incorporation. | 0.41 | 0.27 | 6.2 | 63.1 | 56.3 | 6.8 |

[1] Each exchange series followed by staged calcination for 2 hours each at 200° C., 350° C. and 500° C.
[2] ANE=Ammonium nitrate exchange in 2 M aqueous solution for 2 hours at boiling temperature.
[3] RT=Room temperature.

EXAMPLE II

This example demonstrates the importance of a high initial Si/Al ratio and the benefits derived from adding chromate ions to the aqueous ammonium salt exchange solution.

showed the same relative increase in either series. Consistently, addition of ammonium dichromate to the exchange solution in the second pretreatment phase led to catalysts about 30% more active compared with the basic preparations. Chromium was not detected (<0.001% wt.) in the finished catalysts.

TABLE 2 n-Hexane isomerization over Pt on L-sieve zeolites

| SK-45 sample | First exchange series [1] | Second exchange series [1] | Third exchange series [1] | Pt, percent wt. | K, percent wt. | Benzene sorption, percent wt. | Total conversion percent wt. | Conversion to C₆ isomers, percent | C₁-O₅, percent wt. | Si/Al wt' |
|---|---|---|---|---|---|---|---|---|---|---|
| A | 3 ANE [2] | 2 ANE | 1 ANE and Pt incorp. | 0.45 | 0.10 | 2.8 | 31.6 | 26.6 | 5.0 | 3.5 |
|   | 3 ANE | 2 ANE plus 6 g. (NH₄)₂Cr₂O₇ per liter | do | 0.33 | 0.17 | 3.1 | 41.1 | 35.3 | 5.8 | 3.6 |
| B | 3 ANE | 2 ANE | do | 0.38 | 0.24 | 6.4 | 50.6 | 48.2 | 2.4 | 4.1 |
|   | 3 ANE | 2 ANE plus 6 g. (NH₄)₂Cr₂O₇ per liter | do | 0.37 | 0.12 | 6.2 | 68.4 | 65.0 | 3.4 | 4.2 |

[1] Each exchange series followed by staged calcination for 2 hours each at 200° C., 350° C. and 500° C.

[2] ANE=ammonium nitrate exchange in 2 M aqueous solution for 2 hours at boiling temperature.

What is claimed is:

1. A method of preparing an improved crystalline aluminosilicate L-zeolite catalyst which comprises:
   (a) selecting an L-zeolite having a silicon/aluminum weight ratio greater than about 3;
   (b) contacting the zeolite with an aqueous solution of an ammonium salt solution at about 100° C.;
   (c) calcining the zeolite at a temperature below about 600° C.;
   (d) contacting the calcined zeolite with an aqueous ammonium salt solution containing an anionic form of chromium not associated with a metallic cation at about 100° C.;
   (e) repeating steps (c) and (d) and (b) until the alkali metal content of the zeolite is reduced below about 0.35% wt. and the crystallinity loss is not greater than 20% of that of the starting zeolite; and
   (f) composing the zeolite with hydrogenating metals selected from Groups VI-B and VIII and drying and calcining the composite.

2. The method of claim 1 wherein the ammonium salt solution is about 2 molar ammonium nitrate.

3. The method of claim 1 wherein the chromate ions are derived from ammonium-dichromate.

4. The method of claim 1 wherein the hydrogenating metal is from 0.2 to 2% wt. palladium or platinum.

5. The method of claim 1 wherein the potassium content of the zeolite is reduced to between 0.01–0.2% wt.

6. The method of claim 1 wherein the L-zeolite selected in step (a) has an alkali metal content greater than about 2% wt.

7. The method of claim 6 wherein (a) the silicon/aluminum weight ratio is about 4; (b) the ammonium salt solution is about 2 M ammonium nitrate; (c) the zeolite is calcined at a final temperature of about 500° C.; (d) the chromate ions are supplied by adding about 6 grams (NH₄)₂Cr₂O₇ per liter of 2 M ammonium nitrate solution; and (e) the potassium content of the zeolite is reduced to between 0.01–0.2% wt.

8. The method of claim 7 wherein the hydrogenating metal is from 0.2–2% wt. platinum.

9. The method of claim 7 wherein the hydrogenating metal is from 15–30% wt. nickel and from 0.1–6% wt. tungsten.

References Cited

UNITED STATES PATENTS

| | | | |
|---|---|---|---|
| 3,652,459 | 3/1972 | Parthasarathy et al. | 252—455 Z |
| 3,654,185 | 4/1972 | Berry | 252—455 Z |
| 3,375,065 | 3/1968 | McDaniel et al. | 252—455 Z |

CARL F. DEES, Primary Examiner

U.S. Cl. X.R.

423—112